US012785366B2

(12) United States Patent
Tremelling et al.

(10) Patent No.: US 12,785,366 B2
(45) Date of Patent: Nov. 3, 2026

(54) COMPACT SWITCHBOARD SYSTEMS AND METHODS

(71) Applicant: ABB Schweiz AG, Baden (CH)

(72) Inventors: Darren Tremelling, Apex, NC (US); Stefan Rakuff, Garner, NC (US); Will Eakins, Coventry, CT (US); Sheng Zhong, Hillsborough, NC (US); Christopher Scott, Raleigh, NC (US); Christian White, Pittsboro, NC (US); Nikolaus Zant, Raleigh, NC (US); Elio Perigo, Wendell, NC (US)

(73) Assignee: ABB Schweiz AG, Baden (CH)

( * ) Notice: Subject to any disclaimer, the term of this patent is extended or adjusted under 35 U.S.C. 154(b) by 177 days.

(21) Appl. No.: 18/500,643

(22) Filed: Nov. 2, 2023

(65) Prior Publication Data

US 2025/0149866 A1 May 8, 2025

(51) Int. Cl.

| | |
|---|---|
| ***H02B 1/04*** | (2006.01) |
| ***H02B 3/00*** | (2006.01) |
| *H01R 33/00* | (2006.01) |

(52) U.S. Cl.

CPC ............... *H02B 1/041* (2013.01); *H02B 3/00* (2013.01); *H01R 33/00* (2013.01)

(58) Field of Classification Search

None

See application file for complete search history.

(56) References Cited

U.S. PATENT DOCUMENTS

| | | | | |
|---|---|---|---|---|
| 5,295,042 | A * | 3/1994 | Midgley | H02B 1/21 361/652 |
| 8,547,684 | B2 * | 10/2013 | Diaz | H02B 1/056 361/627 |
| 9,112,336 | B2 * | 8/2015 | Samuelson | H02B 1/056 |
| 10,170,901 | B2 | 1/2019 | Lynam et al. | |
| 10,250,018 | B2 | 4/2019 | Baillargeon et al. | |
| 10,790,643 | B2 | 9/2020 | Velthuis et al. | |
| 12,272,931 | B1 * | 4/2025 | Zakershobeiri | H02B 1/20 |
| 2006/0044739 | A1 * | 3/2006 | Oesterhaus | H01R 31/085 361/611 |

(Continued)

FOREIGN PATENT DOCUMENTS

| | | |
|---|---|---|
| CN | 218498524 U | 2/2023 |
| DE | 102012100655 A1 | 12/2012 |

(Continued)

OTHER PUBLICATIONS

International Search Report and Written Opinion for Application No. PCT/US2024/053537, dated Feb. 5, 2025, 13 pages.

(Continued)

*Primary Examiner* — Courtney L Smith

(74) *Attorney, Agent, or Firm* — McCarter & English, LLP; Michael M. Gnibus

(57) ABSTRACT

An electrical switchboard is provided. The electrical switchboard includes a plurality of conductive sheets, a plurality of branch devices, each branch device of the plurality of branch devices electrically coupled to each conductive sheet of the plurality of conductive sheets, and a supply device electrically coupled to each conductive sheet of the plurality of conductive sheets. The supply device is configured to supply electric power to the plurality of branch devices via the plurality of conductive sheets.

15 Claims, 10 Drawing Sheets

(56) References Cited

U.S. PATENT DOCUMENTS

| | | | | |
|---|---|---|---|---|
| 2017/0063051 | A1* | 3/2017 | Sharp | H02B 1/14 |
| 2019/0189377 | A1* | 6/2019 | Kamor | H02B 1/24 |
| 2019/0237946 | A1* | 8/2019 | Jimenez | H02B 1/056 |
| 2023/0344203 | A1* | 10/2023 | Khzouz | H02B 1/20 |

FOREIGN PATENT DOCUMENTS

| | | | |
|---|---|---|---|
| GB | 2153134 | A | 8/1985 |
| IT | MI970923 | A1 | 10/1998 |

OTHER PUBLICATIONS

International Preliminary Report on Patentability for Application No. PCT/US2024/053537, dated May 15, 2026, 10 pages.

* cited by examiner

COMPACT SWITCHBOARD SYSTEMS AND METHODS

BACKGROUND

The field of the disclosure relates generally to switchboards, and more particularly, to a switchboard utilizing a conductive sheet as an electrical bus.

Switchboards are implemented to distribute electrical power sources to diverse loads at a centralized location. They are manufactured implementing an assembly of conductors enabling electricity transportation between different sources and enabling reduction of current magnitude for proper distribution. Switchboards generally include fusible switches and/or circuit breakers. In such switchboards, busbars may be connected to these switches and/or circuit breakers. Historically, the use of varied paralleling of busbars to meet ampacity and temperature rise requirements has been a common approach. However, this approach utilizes significant numbers of conductors, conductive spacer plates, insulating spacers, and supports, as well as bolts to create a modular structure. Thus, a cross section of the busbar may be relatively large. In addition, many interfaces create the possibility of significant contact resistances (both electrical and thermal), requiring additional labor to both initially assemble and verify connection tightness during product life. An improved electrical bus structure for a switchboard is therefore desirable.

BRIEF DESCRIPTION

In one aspect, an electrical switchboard is provided. The electrical switchboard includes a plurality of conductive sheets, a plurality of branch devices, each branch device of the plurality of branch devices electrically coupled to each conductive sheet of the plurality of conductive sheets, and a supply device electrically coupled to each conductive sheet of the plurality of conductive sheets. The supply device is configured to supply electric power to the plurality of branch devices via the plurality of conductive sheets.

In another aspect, a method for assembling an electrical switchboard is provided. The method includes electrically coupling a plurality of branch devices to each conductive sheet of a plurality of conductive sheets and electrically coupling a supply device to each conductive sheet of the plurality of conductive sheets. The supply device is configured to supply electric power to the plurality of branch devices via the plurality of conductive sheets.

In another aspect, an electrical switchboard is provided. The electrical switchboard includes a plurality of conductive sheets and a supply device electrically coupled to each conductive sheet of the plurality of conductive sheets. The supply device is configured to supply electric power to a plurality of branch devices via the plurality of conductive sheets.

DETAILED DESCRIPTION

Figure 1:
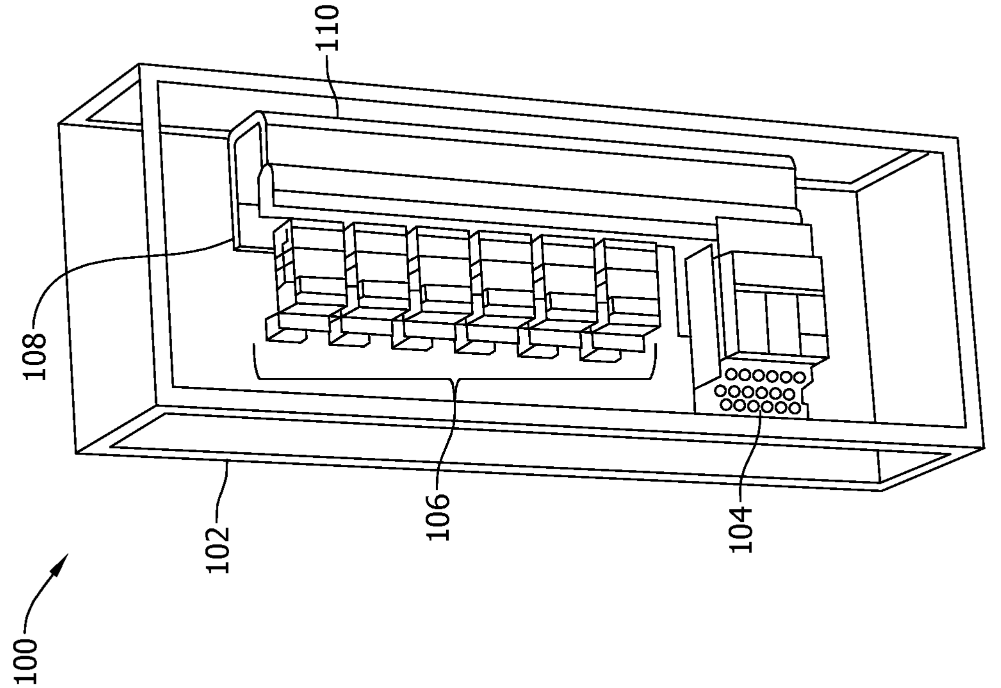
FIG. 1 is a perspective view of an example switchboard.

Example embodiments of the present disclosure include electrical switchboard, which includes a plurality of conductive sheets. A plurality of branch circuit breakers and a main or supply circuit breaker are electrically coupled to each of the plurality of conductive sheets, such that the supply circuit breaker can supply electrical power received from an external power source to the branch circuit breakers through the conductive sheets. The electrical power may be alternating current (AC) power, such as three-phase power, with at least one of the conductive sheets carrying each of the phases of the AC power. The conductive sheets are shaped such that the supply circuit breaker and branch circuit breakers can be coupled directly to the conductive sheets, which reduces a need for specialized connectors and provides flexibility in where or how many circuit breakers can attached to the conductive sheets. While described in the context of an electrical switchboard, conductive sheets such as those described herein may be used to form electrical busses in other applications as well.

As used herein, the term "sheet" refers to a body of material that is relatively thin in comparison to its length and width. For example, the conductive sheet described herein may have a thickness of 0.075 inches (1.9 millimeters (mm)) or less, and a width and/or length of at least an inch (25.4 mm), and in some implementations, of at least 12 inches (305 mm), or at least 48 inches (1220 mm).

Utilizing conductive sheets, rather than busbars or other known structures, as an electrical bus within the switchboard offers certain advantages in terms of current carrying capacity, thermal characteristics, ease of manufacture, assembly, and installation, space utilization, and reducing an amount of material needed to construct the switchboard or other final application. For example, utilizing conductive sheets may reduce material needed to couple a supply to one or more distribution branches in an electrical switchboard, increase thermal transfer (e.g. cooling) through conductors, increase a current carrying capacity of the electrical bus, reduce a number of parts and number of assembly steps needed to construct the electrical bus, and/or reduce a cost of materials needed to manufacture an electrical switchboard and/or an electrical bus.

Figure 2:
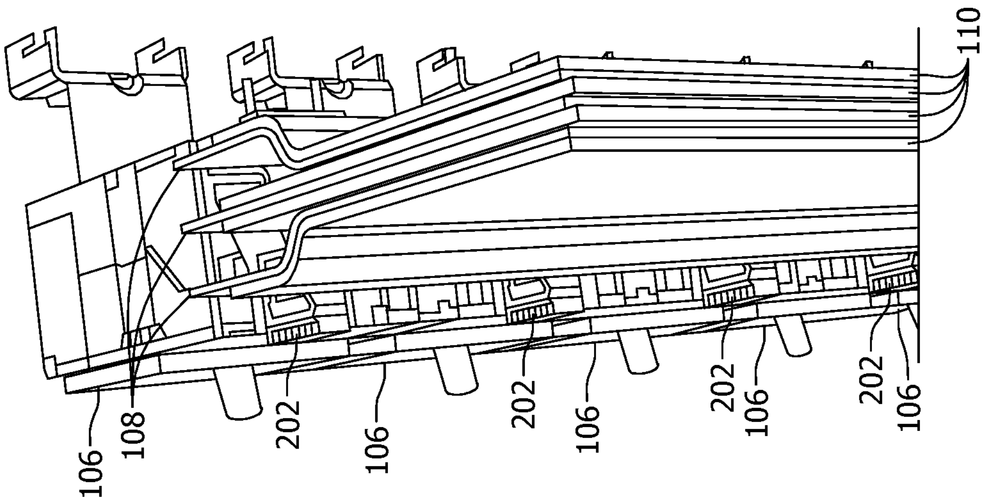
FIG. 2 is a perspective view of example branch circuit breakers, conductive sheets, and dielectric layers for use in the switchboard shown in FIG. 1 showing the conductive sheets and dielectric layers in cross-section.
Figure 3:
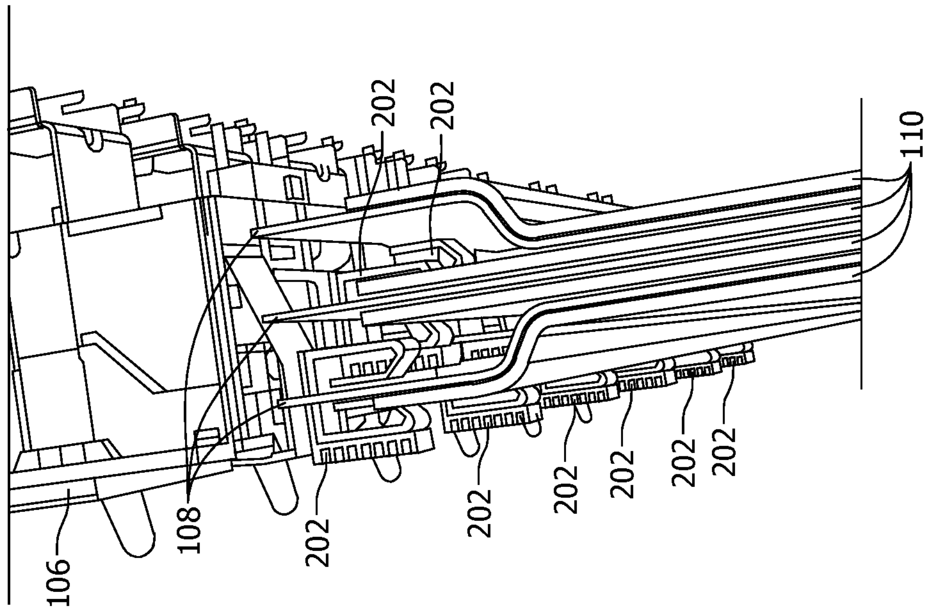
FIG. 3 is another perspective view of the example branch circuit breakers, conductive sheets, and dielectric layers shown in FIG. 2.

FIG. 1 is a perspective view of an example switchboard 100. In the example embodiment, switchboard 100 includes a housing 102, a main or supply circuit breaker 104, a plurality of branch circuit breakers 106, a plurality of conductive sheets 108, and a plurality of dielectric layers 110. FIG. 2 is a perspective view of branch circuit breakers 106, conductive sheets 108, and dielectric layers 110 showing conductive sheets 108 and dielectric layers 110 in cross-section, and FIG. 3 is another perspective view of view of branch circuit breakers 106, conductive sheets 108, and dielectric layers 110.

In the example embodiment, supply circuit breaker 104 has a line-side connection (not shown) which receives electrical power (e.g., three-phase power) from a utility power main or an upstream switch and a load-side connection that electrically connects to all of the plurality of branch circuit breakers 106 via conductive sheets 108. Likewise, each of the plurality of branch circuit breakers 106 has a line-side connection electrically connected to supply circuit breaker 104 and a load-side connection (not shown), which may be electrically connected to one or more loads. Opening supply circuit breaker 104 disconnects power to all of branch circuit breakers 106 and their associated downstream loads, and opening and closing of one of branch circuit breakers 106 disconnects or connects power to a downstream load corresponding to that branch circuit breaker 106. In some embodiments, supply circuit breaker 104 and/or branch circuit breakers are not present, and conductive sheets 108 are coupled directly to supply and/or distribution lines.

Conductive sheets 108 form an electrical bus to electrically connect supply circuit breaker 104 to branch circuit breakers 106. In some embodiments, as shown in FIGS. 1-3, one conductive sheet 108 is present for carrying each electrical phase, with each conductive sheet 108 being electrically connected to a corresponding electrical phase conductor of supply circuit breaker 104 and branch circuit breakers 106. Dielectric layers 110 are disposed between and surrounding each conductive sheet 108 to provide electrical insulation between each conductive sheet 108 and between conductive sheets 108 and external objects. In some embodiments, powder coating or other insulation techniques may be used in addition or in alternative to using dielectric layers 110.

Due to its high surface area-to-volume ratio, utilizing a sheet or sheet-like form factor, such as that of conductive sheets 108, enables a relatively high current-carrying capacity for the amount of material used and enhances heat transfer from the conductive sheets to the environment, which may reduce a need to use other cooling mechanisms such as forced convection (e.g., fans). This form factor also improves efficiency in material utilization, simplicity of manufacturing and assembly, and utilization of space. As shown in FIGS. 2 and 3, in some embodiments, branch circuit breakers 106 are attached directly to conductive sheets 108 utilizing fasteners such as clips 202, which are configured to engage with respective conductive sheets 108. It should be appreciated that, in addition to clips 202, other types of fasters, such as bolts, may be used to attach supply circuit breaker 104 and/or branch circuit breakers 106 directly to conductive sheets 108.

Figure 4:
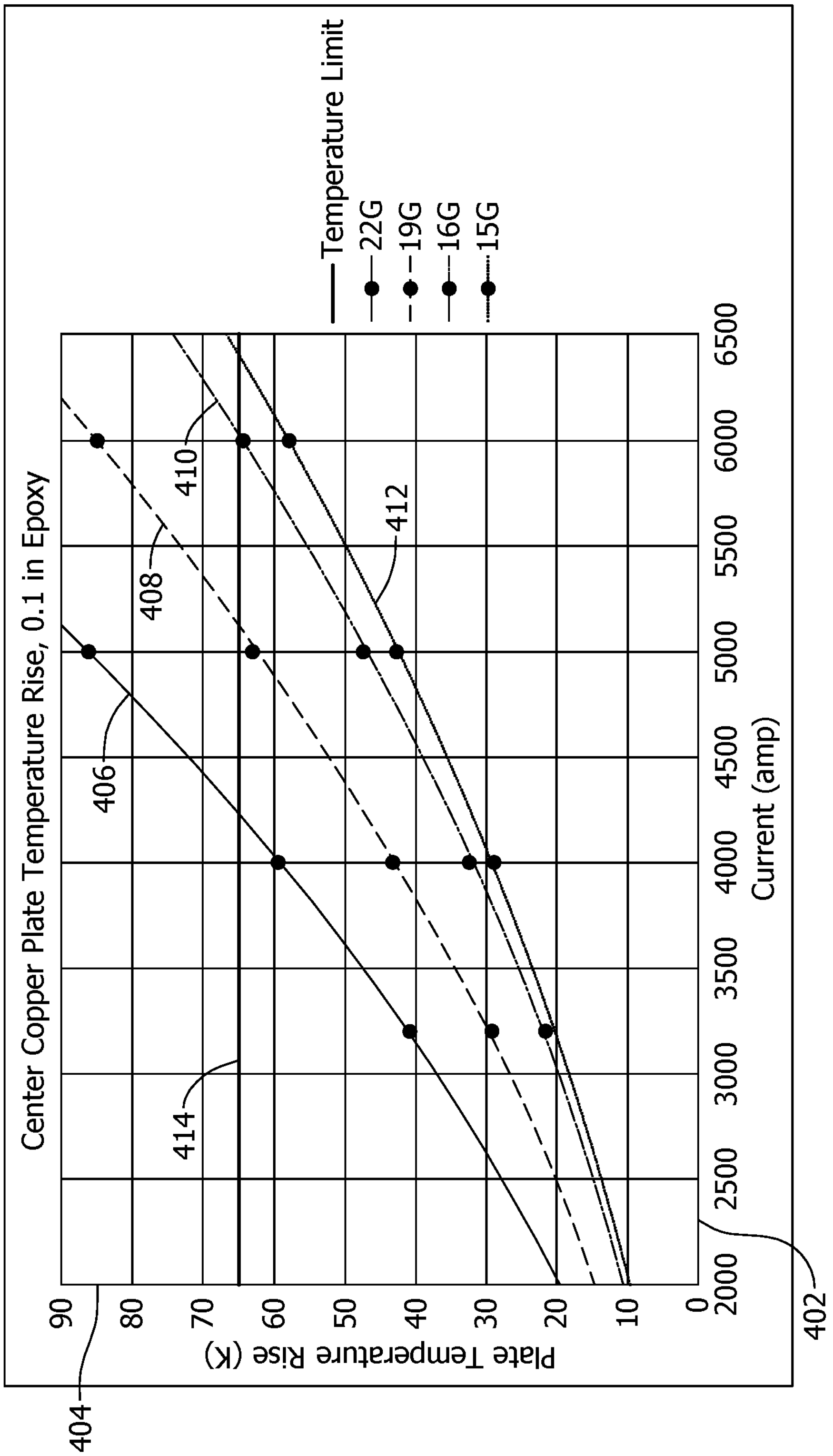
FIG. 4 is a graph illustrating temperature rise in conductive sheets such as those shown in FIGS. 1-3.

FIG. 4 is a graph 400 illustrating temperature rise in conductive sheets 108 of different thicknesses defined according to Standard wire gauges. Graph 400 includes a horizontal axis 402 representing current in amperes (A), ranging from 2000 A to 6500 A. Graph 400 further includes a vertical axis 404 representing plate temperature rise in kelvin (K), ranging from 0 K to 90 K. Graph 400 further includes a first curve 406 corresponding to a 22 gauge copper conductive sheet 108, a second curve 408 corresponding to a 19 gauge copper conductive sheet 108, a third curve 410 corresponding to a 16 gauge copper conductive sheet 108, and a fourth curve 412 corresponding to a 15 gauge copper conductive sheet 108. Graph 400 also shows a temperature limit 414, which corresponds to an example maximum desired temperature rise of 65 K. It should be appreciated that the maximum desired temperature rise may vary depending on the application.

As illustrated by graph 400, temperature rise generally increases as current increases for each gauge, while thicker gauge conductive sheets 108 experience less heating than thinner gauge conductive sheets 108. For example, a 15 or 16 gauge copper conductive sheet 108 has a temperature rise of less than 65 K at a current of 6000 A. Accordingly, the thickness of conductive sheet 108 may be selected based on current and temperature rise requirements, with thicker conductive sheets 108 being appropriate in applications requiring greater current and/or a lower tolerance for temperature rise.

Figure 5:
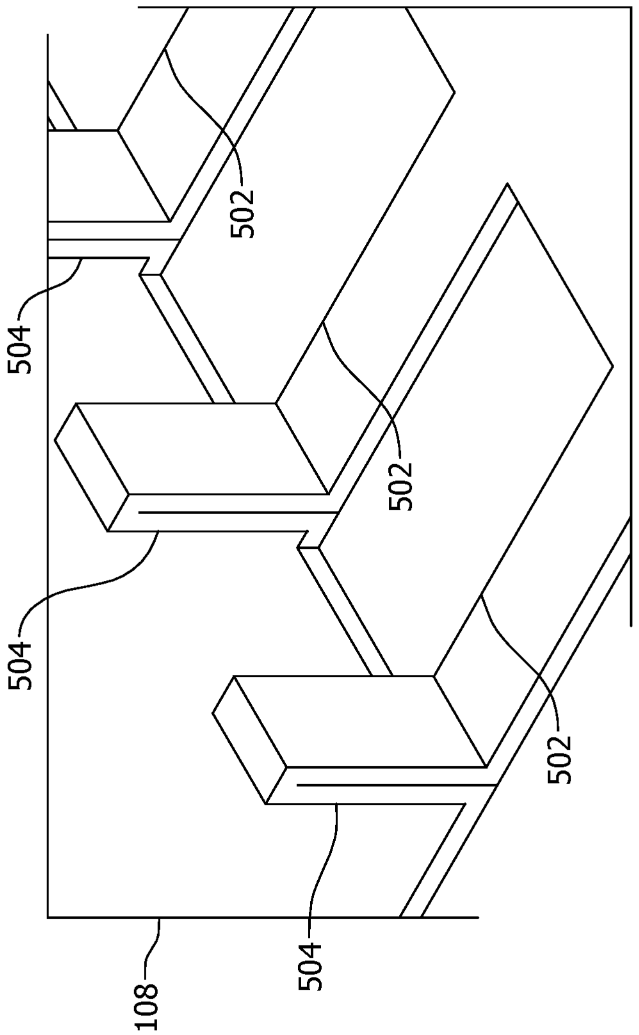
FIG. 5 is a perspective view of another example conductive sheet.

FIGS. 5-9B illustrate an example embodiment of an example bus structure implemented using conductive sheets 108. In the example embodiment, as shown in FIG. 5, openings 502 and tabs 504 are formed in conductive sheet 108, for example by stamping and folding conductive sheet 108.

Figure 6:
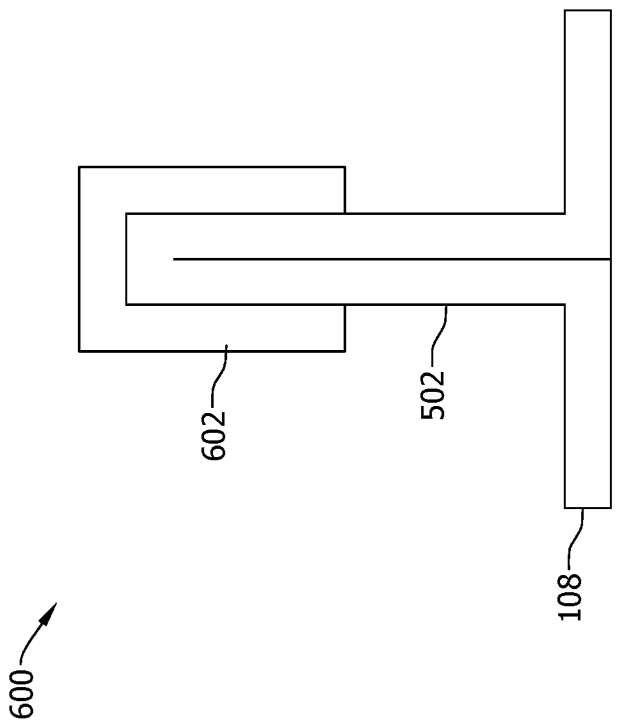
FIG. 6 is a cross-sectional view of an example bar structure including the conductive sheet shown in FIG. 5 with a fitted cap.

FIG. 6 illustrates an example bar structure 600 implemented using conductive sheets 108 as illustrated in FIG. 5. In the example embodiment, as shown in FIG. 6, a cap 602 is fitted onto tab 504 to form bar structure 600, which runs parallel to and in electrical connection with conductive sheet 108. Other components such as supply circuit breaker 104 and/or branch circuit breakers 106 (shown in FIG. 1) can be coupled to conductive sheet 108 via cap 602. In some embodiments, cap 602 is shaped and/or includes mating provisions configured to attach to these other components and/or enable these other components to be mounted on cap 602. The shape may be customized based on the specific components that are to be connected to cap 602.

In some embodiments, cap 602 is bonded to conductive sheets using techniques such as ultrasonic welding, soldering, friction welding, and/or brazing. In some embodiments, conductive sheets 108 and/or cap 602 are formed from copper, which in some applications improves electrical and thermal conductivity and reduces interface effects with other copper components, such as connectors to supply circuit breaker 104 and/or branch circuit breakers 106. Additionally or alternatively, conductive sheets 108 and/or cap 602 may be fabricated using another material such as aluminum, which in some implementations may reduce cost and/or weight compared to copper, but overall loss density would consider somewhat thicker aluminum sheet compared to copper. In some embodiments, cap 602 is configured to be fitted across multiple tabs 504 of a particular conductive sheet 108 as shown, for example, in FIGS. 7-9B.

Figure 7:
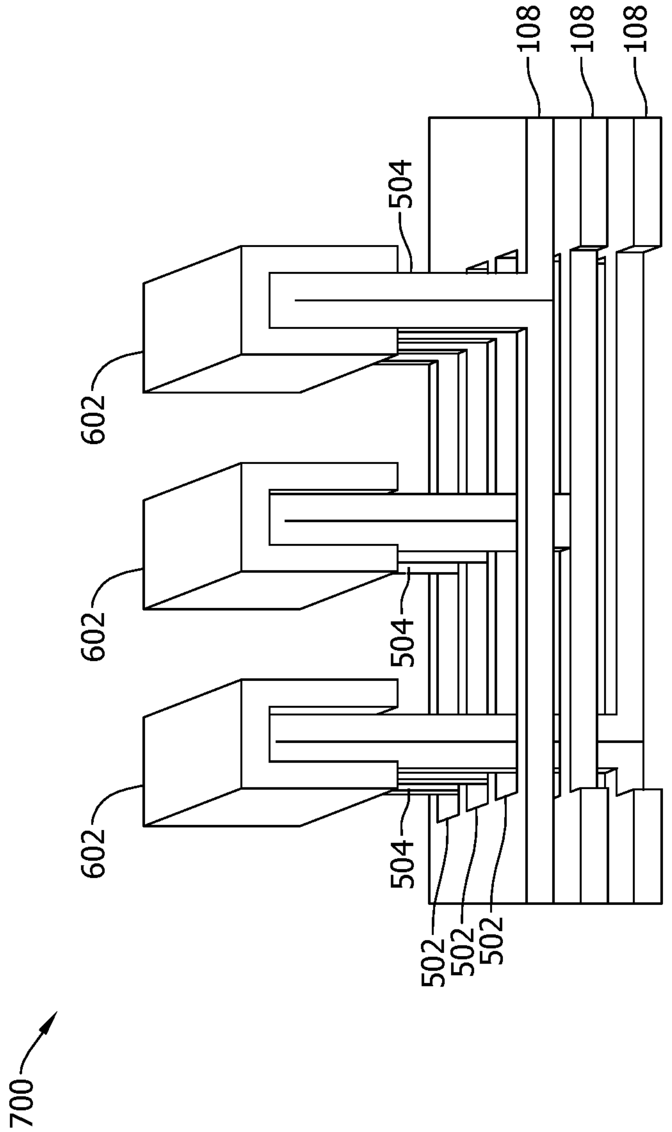
FIG. 7 is a perspective view of an example electrical bus structure using the bar structure shown in FIG. 6.
Figure 8:
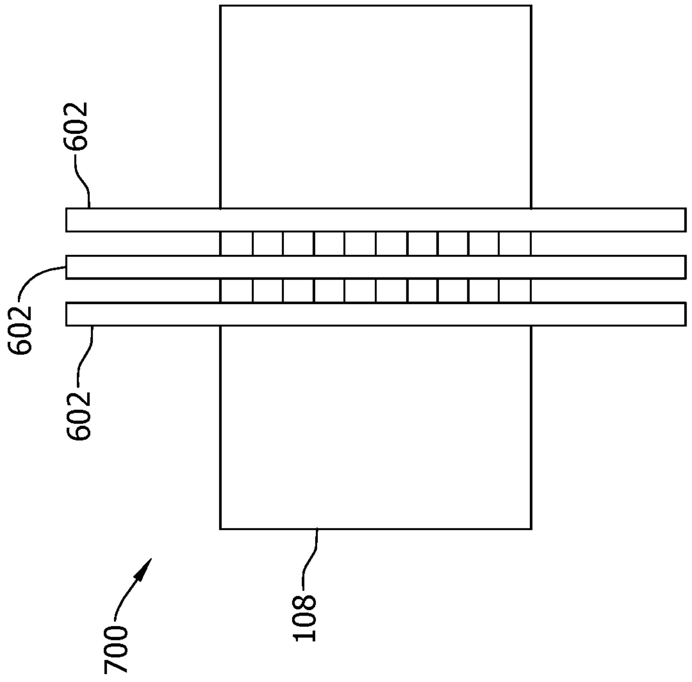
FIG. 8 is a plan view of the electrical bus structure shown in FIG. 7.

FIGS. 7 and 8 illustrate an electrical bus structure 700 formed using bar structures 600. In the example embodiment shown in FIGS. 7 and 8, multiple conductive sheets 108 are positioned adjacently, with respective tabs 504 positioned in offset rows and extending in the same direction, such that tabs 504 of lower conductive sheets 108 pass though respective openings 502 of upper conductive sheets. A respective cap 602 is fitted onto tabs 504 of each conductive sheet 108, forming a structure similar to a vertical bus. In some embodiments, caps 602 extend beyond the edges of conductive sheets 108, as shown in FIGS. 7 and 8. In some embodiments, an insulator such as dielectric layers 110 (not shown in FIGS. 7 and 8) is positioned around and/or between conductive sheets 108. While openings 502 are shown as being similar in size, it should be appreciated that openings 502 do not need to be the same size or shape. For example, the lowest conductive sheet 108 may include smaller openings, because there are no tabs 504 passing though the lowest conductive sheet 108. In some embodiments, the shapes and/or sizes of openings 502 are selected to reduce or minimize their size while maintaining clearance between different conductive sheets 108. For example, the lowest conductive sheet 108 may not include openings 502, because no tabs 504 pass through the lowest conductive sheet 108. By reducing or minimizing an area of openings 502, the area and current capacity of conductive sheets 108 may be increased.

Figure 9B:
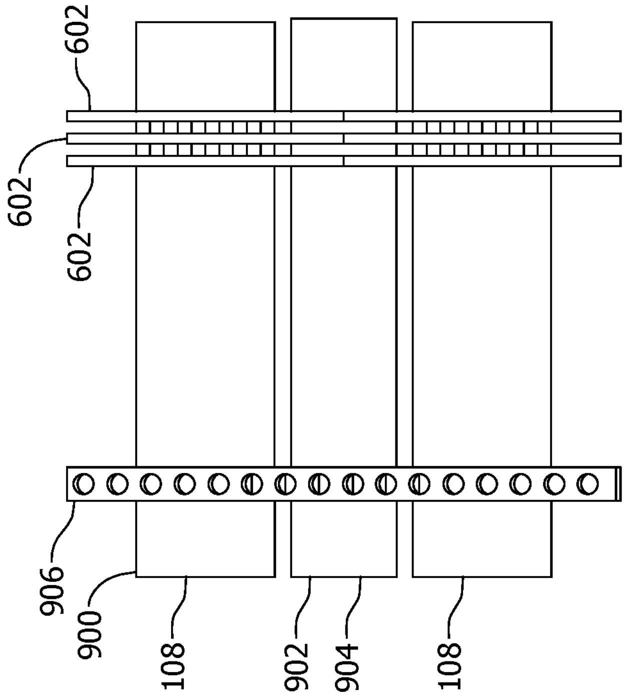
FIG. 9B is a plan view of the multiple sheet distribution system shown in FIG. 9A with a neutral bus.
Figure 9A:
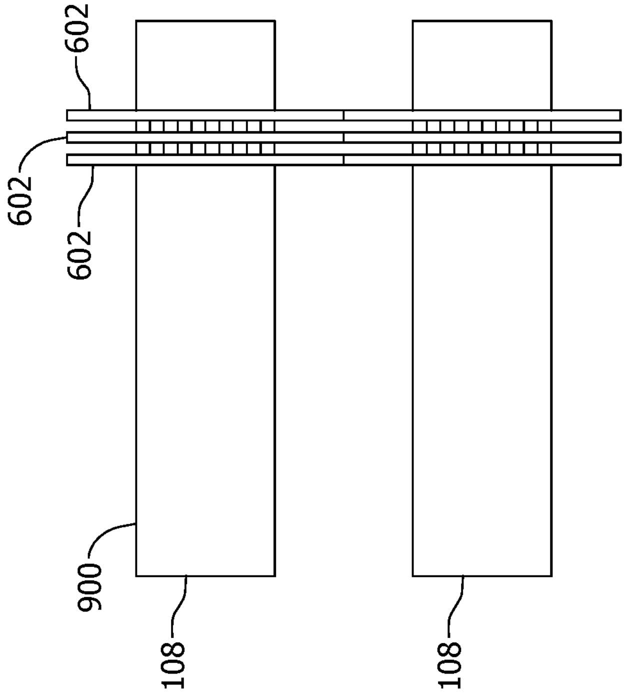
FIG. 9A is a plan view of a multiple sheet distribution system using the bar structure shown in FIG. 6.

FIG. 9A depicts a multiple sheet distribution system 900, which includes multiple conductive sheets 108 and caps 602. FIG. 9B depicts multiple sheet distribution system 900 with a neutral bus 902. By using caps 602 to couple multiple conductive sheets 108, an overall height of multiple sheet distribution system 900 can be extended, for example, to increase an overall current carrying capacity and/or to provide more room to couple components such as supply circuit breaker 104 and/or branch circuit breakers 106 to multiple sheet distribution system 900, particularly in cases in which conductive sheets 108 are available in certain standard and/or predefined sizes.

As shown in FIG. 9B, neutral bus 902 includes one or more neutral sheets 904, which may be at least partially positioned within spaces between conductive sheets 108. Neutral bus 902 further includes a bar 906 electrically and mechanically connected to neutral sheet 904. While one bar 906 is shown, in some embodiments, neutral bus 902 may include multiple bars 906. The positions and number of bars 906 may be selected depending on the application. For example, when used in a distribution application, bar 906 may be positioned near breaker terminations (e.g., of supply circuit breaker 104 if on the supply side and/or branch circuit breakers 106 if on the distribution side), for example, to reduce an amount of cabling needed to electrically connect these components to neutral bus 902. In some implementations, utilizing multiple bars 906 reduces an overall volume of cables needed.

Figure 10:
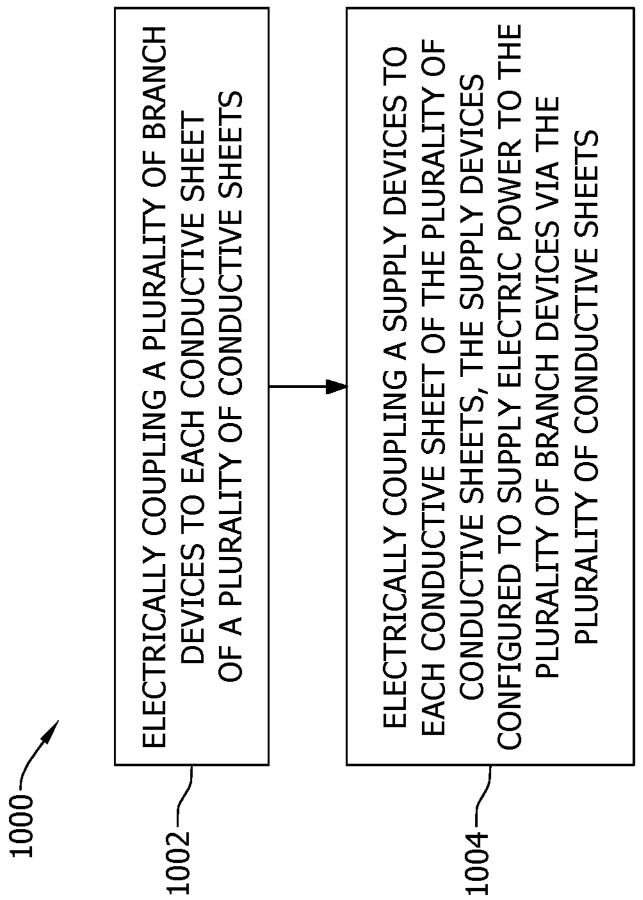
FIG. 10 is a flow chart illustrating an example method for assembling the switchboard shown in FIG. 1.

FIG. 10 is a flowchart illustrating an example method 1000 for assembling an electrical distribution device (such as switchboard 100).

Method 1000 includes electrically coupling 1002 a plurality of branch devices (such as branch circuit breakers 106) to each conductive sheet of a plurality of conductive sheets (such as conductive sheets 108).

Method 1000 further includes electrically coupling a supply device (such as supply circuit breaker 104) to each conductive sheet of the plurality of conductive sheets. The supply device configured to supply electric power to the plurality of branch devices via the plurality of conductive sheets.

In some embodiments, method 1000 further includes positioning at least one dielectric layer (such as dielectric layer 110) adjacent to at least one conductive sheet of the plurality of conductive sheets. In some such embodiments, method 1000 further includes positioning the at least one dielectric layer between two conductive sheets of the plurality of conductive sheets.

In some embodiments, method 1000 includes forming at least one tab (such as tab 504) on each conductive sheet of the plurality of conductive sheets. In some such embodiments, forming the at least one tab of a conductive sheet of the plurality of conductive sheets includes folding the conductive sheet.

In some embodiments, method 1000 further includes fitting at least one cap (such as cap 602) onto the at least one tab. In some such embodiments, method 1000 further includes engaging and electrically coupling the cap to the supply device and/or at least one branch device of the plurality of branch devices. In some such embodiments, method 1000 further includes fitting the at least one cap onto a first tab of a first conductive sheet of the plurality of conductive sheets and a second tab of a second conductive sheet of the plurality of conductive sheets (e.g., to form as structure such as multiple sheet distribution system 900).

Example embodiments of a switchboard are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) reducing material needed to couple a supply to one or more distribution branches in an electrical switchboard by using one or more conductive sheets to couple the supply and distribution branches; (b) increasing thermal transfer (e.g. cooling) of conductors within an electrical bus using one or more conductive sheets as conductors of the electrical bus; (c) increasing a current carrying capacity of an electrical bus by using one or more conductive sheets as conductors of the electrical bus; (d) reducing a number of parts needed to manufacture an electrical bus for an electrical switchboard by using one or more conductive sheets as conductors of the electrical bus; and (e) reducing a cost of materials of an electrical switchboard and/or an electrical bus by using one or more conductive sheets as conductors of the electrical bus.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical switchboard comprising:

a plurality of conductive sheets, wherein each conductive sheet of said plurality of conductive sheets comprises at least one tab;

a plurality of branch devices, each branch device of said plurality of branch devices electrically coupled to each conductive sheet of said plurality of conductive sheets;

a supply device electrically coupled to each conductive sheet of said plurality of conductive sheets, said supply device configured to supply electric power to said plurality of branch devices via said plurality of conductive sheets; and at least one cap fitted onto the at least one tab, wherein the supply device and/or at least one branch device of the plurality of branch devices is configured to engage and electrically couple to the cap.

2. The electrical switchboard of claim 1, wherein each branch device of said plurality of branch devices comprises at least one clip configured to engage a respective conductive sheet of said plurality of conductive sheets.

3. The electrical switchboard of claim 1, further comprising at least one dielectric layer disposed adjacent to at least one conductive sheet of said plurality of conductive sheets.

4. The electrical switchboard of claim 3, wherein said at least one dielectric layer is disposed between two conductive sheets of said plurality of conductive sheets.

5. The electrical switchboard of claim 1, wherein said at least one tab is formed by folding said conductive sheet.

6. The electrical switchboard of claim 1, wherein said at least one cap is fitted onto a first tab of a first conductive sheet of said plurality of conductive sheets and a second tab of a second conductive sheet of said plurality of conductive sheets.

7. The electrical switchboard of claim 1, wherein at least one of said plurality of conductive sheets defines an opening, and wherein at least one tab of another conductive sheet of said plurality of conductive sheets extends through the opening.

8. The electrical switchboard of claim 1, wherein the plurality of branch devices include at least one circuit breaker.

9. The electrical switchboard of claim 1, wherein the supply device comprises a circuit breaker.

10. A method for assembling an electrical switchboard, said method comprising:

electrically coupling a plurality of branch devices to each conductive sheet of a plurality of conductive sheets, wherein each conductive sheet of said plurality of conductive sheets comprises at least one tab; and electrically coupling a supply device to each conductive sheet of the plurality of conductive sheets, the supply device configured to supply electric power to the plurality of branch devices via the plurality of conductive sheets, wherein:

at least one cap is fitted onto the at least one tab, and the supply device and/or at least one branch device of the plurality of branch devices is configured to engage and electrically couple to the cap.

11. The method of claim 10, further comprising positioning at least one dielectric layer adjacent to at least one conductive sheet of the plurality of conductive sheets.

12. The method of claim 11, further comprising positioning the at least one dielectric layer between two conductive sheets of the plurality of conductive sheets.

13. The method of claim 10, wherein forming the at least one tab of a conductive sheet of the plurality of conductive sheets comprises folding the conductive sheet.

14. The method of claim 10, further comprising engaging the cap to the supply device and/or at least one branch device of the plurality of branch devices.

15. An electrical switchboard comprising:

a plurality of conductive sheets, wherein each conductive sheet of said plurality of conductive sheets comprises at least one tab;

a supply device electrically coupled to each conductive sheet of said plurality of conductive sheets, said supply device configured to supply electric power to a plurality of branch devices via said plurality of conductive sheets; and at least one cap fitted onto the at least one tab, wherein the supply device and/or at least one branch device of the plurality of branch devices is configured to engage and electrically couple to the cap.

* * * * *